US012018626B1

(12) United States Patent
Miles et al.

(10) Patent No.: US 12,018,626 B1
(45) Date of Patent: Jun. 25, 2024

(54) WORK VEHICLE DUAL FUEL COMPRESSION IGNITION POWER SYSTEM

(71) Applicant: Deere & Company, Moline, IL (US)

(72) Inventors: Scott R. Miles, Cedar Falls, IA (US); Danan Dou, Cedar Falls, IA (US); Bryan T. Geisick, Cedar Falls, IA (US)

(73) Assignee: DEERE & COMPANY, Moline, IL (US)

(*) Notice: Subject to any disclaimer, the term of this patent is extended or adjusted under 35 U.S.C. 154(b) by 0 days.

(21) Appl. No.: 18/177,514

(22) Filed: Mar. 2, 2023

(51) Int. Cl.
*F02D 41/00* (2006.01)
*F02D 19/06* (2006.01)
*F02M 26/22* (2016.01)
*F02M 26/36* (2016.01)

(52) U.S. Cl.
CPC ..... *F02D 41/0077* (2013.01); *F02D 19/0639* (2013.01); *F02D 19/0665* (2013.01); *F02M 26/22* (2016.02); *F02M 26/36* (2016.02)

(58) Field of Classification Search
CPC ............. F02D 41/0077; F02D 19/0639; F02D 19/0665; F02M 26/22; F02M 26/36
See application file for complete search history.

(56) References Cited

U.S. PATENT DOCUMENTS 6,321,699 B1 11/2001 Britton
8,522,756 B2 9/2013 Vuk et al.
9,316,180 B2 4/2016 Heiermann
9,903,262 B2 2/2018 Edwards et al.
11,536,213 B2 12/2022 Miles et al.
11,572,673 B2 2/2023 Dou et al.
11,572,824 B2 2/2023 Miles et al.
2003/0200942 A1 10/2003 Dachtchenko et al.
2006/0016420 A1 1/2006 Kuo et al.
(Continued)

FOREIGN PATENT DOCUMENTS

DE 102020119860 A1 * 2/2022
JP 2008223537 A 9/2008
(Continued)

OTHER PUBLICATIONS

Machine Translation of DE 102020119860 A1 PDF File Name: "DE102020119860A1_Machine_Translation.pdf".*
(Continued)

*Primary Examiner* — Grant Moubry
*Assistant Examiner* — Ruben Picon-Feliciano
(74) *Attorney, Agent, or Firm* — KLINTWORTH & ROZENBLAT IP LLP

(57) ABSTRACT

A power system for a work vehicle is provided and includes an intake arrangement configured to intake charge air; a fuel arrangement including a first fuel tank configured to store a first fuel and a second fuel tank configured to store a second fuel; a compression ignition engine including a plurality of piston-cylinder sets configured to receive, ignite, and combust the first fuel, the second fuel, or a combination of the first and second fuels from the fuel arrangement with the charge air from the intake arrangement to generate mechanical power and exhaust gas; and an exhaust gas recirculation (EGR) arrangement configured to direct a portion of the exhaust gas back into the compression ignition engine. The fuel arrangement is arranged to selectively inject the second fuel into the EGR arrangement.

20 Claims, 5 Drawing Sheets

(56) References Cited

U.S. PATENT DOCUMENTS

| | | | |
|---|---|---|---|
| 2007/0204747 A1 | 9/2007 | Aoyama et al. | |
| 2007/0295290 A1 | 12/2007 | Cao | |
| 2007/0295316 A1 | 12/2007 | Davis et al. | |
| 2013/0180485 A1 | 7/2013 | Kamio | |
| 2016/0010576 A1 | 1/2016 | Primus et al. | |
| 2018/0306098 A1 | 10/2018 | Edwards et al. | |
| 2019/0040826 A1 | 2/2019 | McCarthy, Jr. et al. | |
| 2020/0088081 A1 | 3/2020 | Rohde et al. | |
| 2021/0054777 A1 | 2/2021 | Blumreiter et al. | |
| 2022/0003184 A1 | 1/2022 | Blumreiter et al. | |
| 2022/0003318 A1 | 1/2022 | Brushkivskyy et al. | |
| 2022/0018297 A1 | 1/2022 | Blumreiter et al. | |
| 2022/0034284 A1 | 2/2022 | Klingbeil | |
| 2023/0160350 A1 * | 5/2023 | Klingbeil | F02D 41/005 701/104 |

FOREIGN PATENT DOCUMENTS

| | | |
|---|---|---|
| WO | 2020232287 A1 | 11/2020 |
| WO | 2021174016 A1 | 9/2021 |
| WO | 2022011275 A1 | 1/2022 |

OTHER PUBLICATIONS

Utility U.S. Appl. No. 17/659,368, filed Apr. 15, 2022.

AVL—IWIS—Dual Mode VCS TM at httpswww.youtube.comwatchv=cAlb7wJ0Uk8, dated Sep. 11, 2017. (1 page).

CLEARFLAME—ClearFlame Engine Technologies Overview at httpswww.youtube, dated May 18, 2020. (1 page).

CLEARFLAME—SAE Chicago Presents: ClearFlame Engine Technologies at httpswww.youtube.comwatchv=fAIMtoIU2B8, dated Mar. 2021. (1 page).

FEV—VCR Conrod Coupled Simulation at httpswww.youtube.comwatchv=30sEeZ54X_s, dated May 23, 2017. (1 Page).

FEV—Explore FEV's VCR Conrod at httpswww.youtube.comwatchv=ABNZY3Enykg, dated Apr. 24, 2015. (1 page).

Wikipedia—Glow plug (diesel engine) at https://en.wikipedia.org/wiki/Glow_plug_(diesel_engine), undated, admitted prior art. (2 pages).

Nissan—Nissan VC Turbo Engine (Variable Compression Turbo) at https://www.youtube.com/watch?v=YPDXgAWhrs4, dated Mar. 30, 2018. (4 pages).

Utility U.S. Appl. No. 17/975,399, filed Oct. 27, 2022.

Utility U.S. Appl. No. 17/977,016, filed Oct. 31, 2022.

Utility U.S. Appl. No. 18/145,524, filed Dec. 22, 2022.

Utility U.S. Appl. No. 18/145,536, filed Dec. 22, 2022.

USPTO Non-Final Office Action issued in Utility U.S. Appl. No. 18/145,536 dated Dec. 19, 2023.

USPTO Non-Final Office Action issued in U.S. Utility U.S. Appl. No. 18/145,524 dated Mar. 13, 2024.

USPTO Non-Final Office Action issued in U.S. Utility U.S. Appl. No. 17/977,016 dated Feb. 16, 2024.

USPTO Non-Final Office Action issued in U.S. Utility U.S. Appl. No. 18/145,536 dated Dec. 19, 2023.

USPTO Non-Final Office Action issued in U.S. Utility U.S. Appl. No. 18/462,313 dated Feb. 28, 2024.

* cited by examiner

WORK VEHICLE DUAL FUEL COMPRESSION IGNITION POWER SYSTEM

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to work vehicles, and more specifically to work vehicle power systems and methods.

BACKGROUND OF THE DISCLOSURE

Heavy work vehicles, such as used in the construction, agriculture, and forestry industries, typically include a power system with an internal combustion engine. For many work vehicles, the power system includes a diesel engine that may have higher lugging, pull-down, and torque characteristics for associated work operations. However, diesel and other types of fossil fuel-based engines may generate undesirable emissions.

Ethanol, derived from renewable resources such as corn or sugar cane, has been used as a fuel source to reduce greenhouse gas emissions. Typically, within the general consumer automotive markets, ethanol is blended into gasoline and used by spark ignited engines. However, this type of use and such engines are generally not suitable for use in heavy work applications.

SUMMARY OF THE DISCLOSURE

The disclosure provides a work vehicle dual fuel compression ignition power system that facilitates ignition and supports operation in a range of conditions.

In one aspect, the disclosure provides a power system for a work vehicle. The power system includes an intake arrangement configured to intake charge air; a fuel arrangement including a first fuel tank configured to store a first fuel and a second fuel tank configured to store a second fuel; a compression ignition engine including a plurality of piston-cylinder sets configured to receive, ignite, and combust the first fuel, the second fuel, or a combination of the first and second fuels from the fuel arrangement with the charge air from the intake arrangement to generate mechanical power and exhaust gas; and an exhaust gas recirculation (EGR) arrangement configured to direct a portion of the exhaust gas back into the compression ignition engine. The fuel arrangement is arranged to selectively inject the second fuel into the EGR arrangement.

In a further aspect of the power system, the first fuel may have a higher cetane value than the second fuel.

In a further aspect, the power system may include a controller coupled to command the intake arrangement, the fuel arrangement, the compression ignition engine, and the EGR arrangement such that, in a single fuel control mode, the controller commands the fuel arrangement such that only the first fuel is directed into the compression ignition engine; and in a dual fuel control mode, the controller commands the fuel arrangement such that the first fuel is directed into the compression ignition engine and the second fuel is additionally directed into the compression ignition engine via the EGR arrangement.

In a further aspect of the power system, the intake arrangement may include an intake manifold arranged to direct the charge air into the compression ignition engine, and the fuel arrangement may be positioned to selectively direct the second fuel into the EGR arrangement upstream of the intake manifold.

In a further aspect of the power system, the EGR arrangement may include an EGR cooler configured to cool the exhaust gas prior to redirection back into the compression ignition engine, and the fuel arrangement may be positioned to inject the second fuel into the EGR arrangement downstream of the EGR cooler.

In a further aspect of the power system, the EGR arrangement may include a bypass valve upstream of the EGR cooler such that, in a first position of the bypass valve, the exhaust gas passes through the EGR cooler and, in a second position of the bypass valve, the exhaust gas bypasses the EGR cooler.

In a further aspect of the power system, the EGR arrangement may include an EGR control valve, and the fuel arrangement may be positioned to inject the second fuel into the EGR arrangement upstream of the EGR control valve.

In a further aspect of the power system, the EGR arrangement may include an EGR control valve, and the fuel arrangement may be positioned to inject the second fuel into the EGR arrangement downstream of the EGR control valve.

In a further aspect of the power system, the control system may be configured to selectively inject the second fuel into the EGR arrangement based on exhaust gas temperature.

In a further aspect of the power system, the first fuel may be diesel and the second fuel may be ethanol.

In a further aspect, a work vehicle is provided. The work vehicle includes a chassis; a drive assembly supported on the chassis; and a power system supported on the chassis and configured to power the drive assembly. The power system includes an intake arrangement configured to intake charge air; a fuel arrangement including a first fuel tank configured to store a first fuel and a second fuel tank configured to store a second fuel; a compression ignition engine including a plurality of piston-cylinder sets configured to receive, ignite, and combust the first fuel, the second fuel, or a combination of the first and second fuels from the fuel arrangement with the charge air from the intake arrangement to generate mechanical power and exhaust gas; and an exhaust gas recirculation (EGR) arrangement configured to direct a portion of the exhaust gas back into the compression ignition engine. The fuel arrangement is arranged to selectively inject the second fuel into the EGR arrangement.

In a further aspect of the work vehicle, the first fuel may have a higher cetane value than the second fuel.

In a further aspect, the work vehicle may further include a controller coupled to command the intake arrangement, the fuel arrangement, the compression ignition engine, and the EGR arrangement such that, in a single fuel control mode, the controller commands the fuel arrangement such that only the first fuel is directed into the compression ignition engine; and in a dual fuel control mode, the controller commands the fuel arrangement such that the first fuel is directed into the compression ignition engine and the second fuel is additionally directed into the compression ignition engine via the EGR arrangement.

In a further aspect of the work vehicle, the intake arrangement may include an intake manifold arranged to direct the charge air into the compression ignition engine, and the fuel arrangement may be positioned to selectively direct the second fuel into the EGR arrangement upstream of the intake manifold.

In a further aspect of the work vehicle, the EGR arrangement may include an EGR cooler configured to cool the exhaust gas prior to redirection back into the compression ignition engine, and the fuel arrangement may be positioned to inject the second fuel into the EGR arrangement downstream of the EGR cooler.

In a further aspect of the work vehicle, the EGR arrangement may include a bypass valve upstream of the EGR cooler such that, in a first position of the bypass valve, the exhaust gas passes through the EGR cooler and, in a second position of the bypass valve, the exhaust gas bypasses the EGR cooler.

In a further aspect of the work vehicle, the EGR arrangement may include an EGR control valve, and the fuel arrangement may be positioned to inject the second fuel into the EGR arrangement upstream of the EGR control valve.

In a further aspect of the work vehicle, the EGR arrangement may include an EGR control valve, and the fuel arrangement may be positioned to inject the second fuel into the EGR arrangement downstream of the EGR control valve.

In a further aspect of the work vehicle, the control system may be configured to selectively inject the second fuel into the EGR arrangement based on exhaust gas temperature.

In a further aspect of the work vehicle, the first fuel may be diesel and the second fuel may be ethanol.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
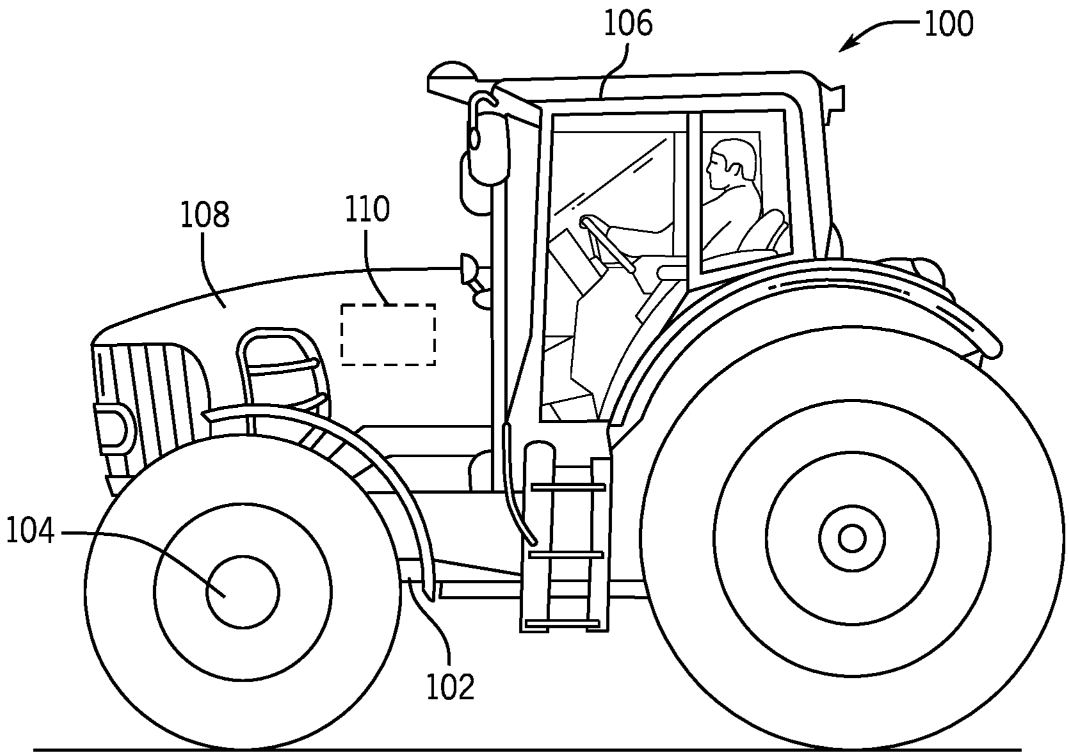
FIG. 1 is a simplified side view of an example work vehicle in the form of a tractor in which a power system may be used in accordance with an embodiment of this disclosure.

The following describes one or more example embodiments of the disclosed power system and method, as shown in the accompanying figures of the drawings described briefly above. Various modifications to the example embodiments may be contemplated by one of skill in the art. Discussion herein may sometimes focus on the example application of power system in a tractor, but the disclosed power system is applicable to other types of work vehicles and/or other types of engine systems.

Work vehicles may include power systems that typically have diesel engines to produce torque in a wide range of applications, such as long-haul trucks, tractors, agricultural or construction vehicles, surface mining equipment, non-electric locomotives, stationary power generators and the like. Even though such engines may have advantageous energy and performance characteristics, diesel and other types of fossil fuel-based engines may generate undesirable emissions. In contrast, ethanol, derived from renewable resources such as corn or sugar cane, has been used as a fuel source to reduce greenhouse gas emissions. Typically, within the general consumer automotive markets, ethanol is blended into gasoline and used by spark ignited engines. However, this type of use and such engines are typically not suitable for use in heavy work applications.

Generally, certain non-diesel fuels that have desirable sourcing, performance, and/or emission characteristics may have relatively low cetane numbers. A cetane number (or cetane value) is an indicator of the propensity of a fuel to autoignite under compression. The scale for measuring cetane numbers ranges from 0 to 100 with higher numbers indicating quicker ignition periods, thereby indicating lower temperatures and pressures required for combustion. In compression combustion engines (e.g., in diesel-type engines), ethanol is generally not used due to its relatively low cetane number (e.g., less than 5) that requires high temperatures for ignition. In other words, compression ignition engines that rely only upon ethanol may encounter challenges in cold start and low load conditions in which the temperature is insufficient for reliable ignition. As examples, diesel fuel will reliably auto-ignite inside an engine cylinder at a temperature of about 500 to 600° C., while a fuel such as ethanol requires a temperature of about 850° C. in the cylinder to reliably auto-ignite.

According to examples discussed herein, a power system may include an engine that operates with a higher cetane fuel, such as diesel, that is selectively supplemented with a lower cetane fuel, such as ethanol and other alcohol-based fuels (e.g., methanol, propanol, etc.), that is injected into the exhaust gas recirculation arrangement to provide sufficient mixing. Such power systems may provide the desired ignition and combustion characteristics while enabling the use of the lower cetane fuels that may have more desirable costs and/or reduced emissions, including lower $CO_2$, $NO_X$, soot, and other undesirable emissions.

In some embodiments, a control strategy may be implemented based on the operating conditions. For example, the engine may be started with 100% diesel (or other high cetane fuel) and even maintained with 100% diesel, yet substituting ethanol (or other low cetane fuel) into the engine to provide several benefits, including: cooler exhaust temperature, higher engine power, lower DEF consumption, lower fuel cost, etc. Such a control strategy may detect the feasibility of dual fuel operation and consider customer value when active. Such implementation may apply to new engine designs, existing engine designs, and retrofit kits offered for engines in the field.

Generally, as used herein, the term "low cetane fuel" may refer to a fuel with a cetane number (or value) less than that of diesel. For example, a low cetane fuel may have a cetane number of less than 40. One such example is ethanol with a cetane number of approximately 5. The term "high cetane fuel" may refer to a fuel with a cetane number (or value) that is equal to or higher than that of diesel. For example, a high cetane fuel may have a cetane number of greater than or equal to 40.

Referring to FIG. 1, in some embodiments, the disclosed power systems and methods are implemented with the use of dual fuels in a compression ignition engine, including the use of relatively low cetane fuels. In the depicted example, such power systems and methods are implemented with a work vehicle 100 embodied as a tractor. In other examples, the disclosed system and method may be implemented in other types of vehicles or machines, including stationary power systems and vehicles in the agricultural, forestry, and/or construction industries.

As shown, the work vehicle 100 may be considered to include a main frame or chassis 102, a drive assembly 104, an operator platform or cabin 106, a power system 108, and a controller 110. As is typical, the power system 108 includes an internal combustion engine used for propulsion of the work vehicle 100, as controlled and commanded by the controller 110 and implemented with the drive assembly 104 mounted on the chassis 102 based on commands from an operator in the cabin 106 and/or as automated within the controller 110.

As described below, the power system 108 may include a number of systems and components to facilitate various aspects of operation. As noted, the engine of the power system 108 may be a compression ignition engine for combustion that may result in improvements in emissions, performance, efficiency, and capability. Moreover, the engine may utilize two different types of fuel provided by a fuel arrangement, as introduced above and discussed in greater detail below. Otherwise, the power system 108 may include an air intake arrangement to provide air that is mixed with fuel and combusted in the engine, as well as additional systems, such as turbocharger and/or exhaust recirculation (EGR) arrangements. Although not shown or described in detail herein, the work vehicle 100 may include any number of additional or alternative systems, subsystems, and elements. Further details of the power system 108 are provided below.

As noted, the work vehicle 100 includes the controller 110 (or multiple controllers) to control one or more aspects of the operation, and in some embodiments, facilitate implementation of the power system 108, including various components and control elements associated with the use of low cetane fuels (e.g., ethanol). The controller 110 may be considered a vehicle controller and/or a power system controller or sub-controller. In one example, the controller 110 may be implemented with processing architecture such as a processor and memory. For example, the processor may implement the functions described herein based on programs, instructions, and data stored in memory.

As such, the controller 110 may be configured as one or more computing devices with associated processor devices and memory architectures, as a hard-wired computing circuit (or circuits), as a programmable circuit, as a hydraulic, electrical or electro-hydraulic controller, or otherwise. The controller 110 may be configured to execute various computational and control functionality with respect to the work vehicle 100 (or other machinery). In some embodiments, the controller 110 may be configured to receive input signals in various formats (e.g., as hydraulic signals, voltage signals, current signals, and so on), and to output command signals in various formats (e.g., as hydraulic signals, voltage signals, current signals, mechanical movements, and so on). The controller 110 may be in electronic, hydraulic, mechanical, or other communication with various other systems or devices of the work vehicle 100 (or other machinery). For example, the controller 110 may be in electronic or hydraulic communication with various actuators, sensors, and other devices within (or outside of) the work vehicle 100, including any devices described below. In some embodiments, the controller 110 may be configured to receive input commands from, and to interface with, an operator via a human-vehicle operator interface that enables interaction and communication between the operator, the work vehicle 100, and the power system 108.

In some examples, the work vehicle 100 may further include various sensors that function to collect information about the work vehicle 100 and/or surrounding environment. Such information may be provided to the controller 110 for evaluation and/or consideration for operating the power system 108. As examples, the sensors may include operational sensors associated with the vehicle systems and components discussed herein, including engine and transmission sensors; fuel and/or air sensors; temperature, flow, and/or pressure sensors; and battery and power sensors, some of which are discussed below. Such sensor and operator inputs may be used by the controller 110 to determine an operating condition (e.g., a load, demand, or performance requirement), and in response, generate appropriate commands for the various components of the power system 108 discussed below, particularly the fuel arrangement for implementation of single and dual fuel control modes. Additional information regarding the power system 108 and the fuel control modes is provided below.

Figure 2:
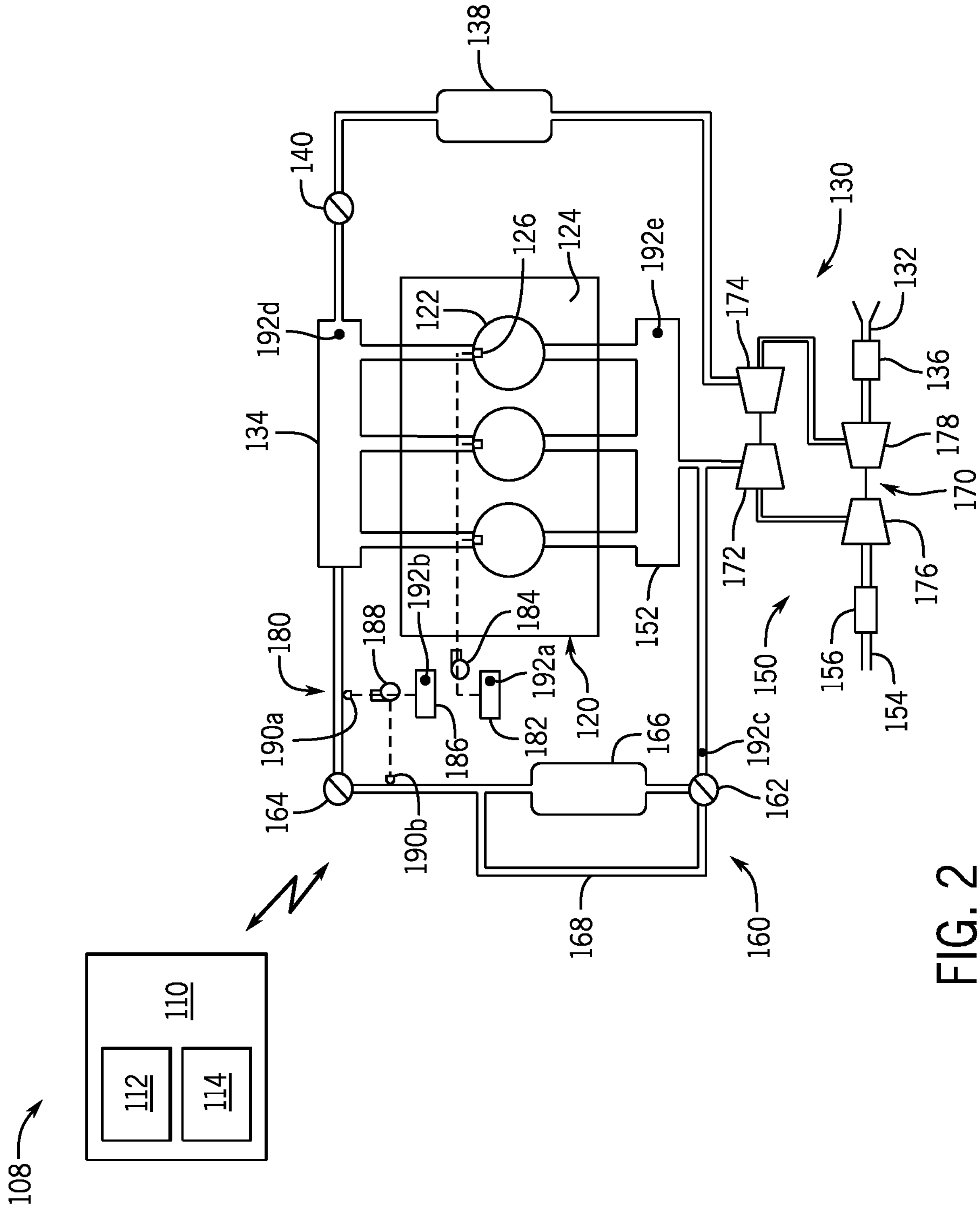
FIG. 2 is a simplified schematic diagram of a power system in accordance with an example embodiment.

Reference is initially made to FIG. 2, which is a schematic illustration of the power system 108 for providing power to the work vehicle 100 of FIG. 1, although the characteristics described herein may be applicable to a variety of machines. The configuration of FIG. 2 is just one example of the power system 108 and example embodiments according to the disclosure herein may be provided in other configurations.

As introduced above, the power system 108 may be controlled with a controller 110 that includes a processor 112 that implements instructions stored in memory 114 based on various inputs, including operator commands and/or sensor input regarding the operating condition. Generally, the controller 110 may implement any of the functions described herein. In various examples, the controller 110 may be a dedicated power system controller or a vehicle controller.

As also introduced above, the power system 108 includes an engine 120 configured to combust a mixture of air from an air intake arrangement 130 and fuel from a fuel arrangement 180 to generate power for propulsion and various other systems, thereby generating an exhaust gas that is accommodated by an exhaust arrangement 150.

As also noted above, the engine 120 is selectively provided air for combustion by the air intake arrangement 130. The air intake arrangement 130, in this example, includes an intake conduit 132 and an air intake manifold 134. The air intake arrangement 130 directs fresh or ambient air through the air intake conduit 132; and the air intake manifold 134 directs at least a portion of that air into the piston-cylinder sets 122 of the engine block 124 to be ignited with the fuel such that the resulting combustion products drive the mechanical output of the engine 120. A filter 136 (or other intake air treatment apparatus) may be arranged on or proximate to the intake conduit 132 to filter the intake air. An air throttle valve 140 may be provided to control the flow of air through the air intake arrangement 130.

In one example, the intake arrangement 130 may include a charge air cooler 138 to reduce the temperature of the charge air (e.g., particularly the compressed charge air from the turbocharger arrangement 170, discussed below). In this example, the charge air cooler 138 is configured to direct the charge air into proximity with cooling air (or other type of coolant) such that the heat is transferred from the charge air to the cooling air. Other cooling or heat exchange mechanisms may be provided.

As noted, the intake air is directed into the engine 120 via the intake manifold 134. Generally, and as discussed below, the engine 120 is primarily an engine that utilizes one or both fuels of the fuel arrangement 180. In one example, and as discussed in greater detail below, the engine 120 may be a compression ignition and combustion engine in configuration and arrangement. The engine 120 may have any number or configuration of piston-cylinder sets 122 within an engine block 124. In the illustrated implementation, the engine 120 is an inline-3 (I-3) engine defining three piston-cylinder sets 122, although other configurations may be provided, including four and six piston-cylinder sets. In addition to those discussed below, the engine 120 may include any suitable features, such as cooling systems, peripheries, drivetrain components, sensors, etc.

In one example, each of the piston-cylinder sets 122 includes a piston arranged within the cylinder to create a combustion chamber in between such that movement of the piston within the cylinder functions to facilitate the flow of gas into and out of the combustion chamber; to compress the gas within the combustion chamber to enable ignition and combustion; and to be driven by the combustion products to transfer the resulting mechanical power from the combustion process to a prime mover of the engine 120. Additionally, a fuel injector 126 is arranged to introduce an amount of fuel into the combustion chamber. Moreover, an intake valve is arranged to open and close an intake port to admit intake gas into the combustion chamber; and an exhaust valve is arranged to open and close an exhaust port to enable gas to flow out of the combustion chamber into the exhaust arrangement 150.

Briefly, collectively and individually, the piston-cylinder sets 122 undergo a four-stroke power cycle in one example embodiment. Generally, the power cycle includes an intake stroke, a compression stroke, a power stroke, and an exhaust stroke, which are constantly repeated during operation of the engine 120. During the intake stroke, the piston moves from the top dead center (TDC) to the bottom dead center (BDC); and during this movement, at least the intake valve is open while the piston pulls air into the combustion chamber by producing vacuum pressure into the cylinder through the downward motion. During the compression stroke, the piston moves from the bottom dead center (BDC) to the top dead center (TDC); and during this movement, both the intake and exhaust valves are closed in this stroke, thereby resulting in air compression to increase the pressure and temperature. At the end of this stroke, fuel is injected by the fuel injector to be ignited and burned in the compressed hot gas. During the power stroke, the piston is driven by the combustion expansion of the fuel and gas mixture from the top dead center (TDC) to the bottom dead center (BDC); and during this movement, both the intake and exhaust valves are closed. During the exhaust stroke, the piston moves from the bottom dead center (BDC) to the top dead center (TDC); and during this movement, the exhaust valve is open while the piston forces exhaust gases out of the combustion chamber. At the end of this stroke, a crankshaft coupled to the piston has completed a second full 360° revolution.

The exhaust gas produced from the combustion process of the engine 120 may be received by the exhaust arrangement 150, which includes an exhaust manifold 152 to receive and distribute the exhaust from the piston-cylinder sets 122. At least a portion of the exhaust gas is directed from the exhaust manifold 152 into an exhaust conduit 154 out of the work vehicle 100. Although not shown in detail, the exhaust gas may flow through one or more exhaust treatment components 156 arranged proximate to the exhaust conduit 154. Such exhaust treatment components may function to treat the exhaust gas passing therethrough to reduce undesirable emissions and may include components such as a diesel oxidation catalyst (DOC), a diesel particulate filter (DPF), a selective catalytic reduction (SCR) system, and the like.

The power system 108 may further include an exhaust gas recirculation (EGR) arrangement 160 and a turbocharger arrangement 170, each of which may have at least portions that may also be considered part of (or otherwise cooperate with) the air intake arrangement 130 and/or the exhaust arrangement 150. In some examples, the turbocharger arrangement 170 may be omitted.

Generally, the EGR arrangement 160 is configured to direct at least a first portion of exhaust gas out of the engine 120 and then back to the air intake arrangement 130 of the engine 120 as EGR gas, i.e., such that a remaining, second portion of the exhaust gas is directed through the turbocharger arrangement 170 and out of the vehicle 100 (FIG. 1) via the exhaust conduit 154 as vehicle exhaust. Generally, the EGR gas may be mixed with charge air (e.g., recirculated back to intake) in order to reduce the formation of NOx during combustion that may otherwise occur. Any suitable amount of exhaust gas may be recirculated (e.g., 10%-30%).

The EGR arrangement 160 may include one or more EGR valves 162, 164 that operate to control the various flows of EGR gas and/or exhaust gas. In this example, the EGR arrangement 160 may have two "paths," e.g., a cooled path in which a first portion of EGR flow is directed through an EGR cooler 166 and a bypass path 168 in which a second portion of EGR flow is directed around (and not through) the EGR cooler 166. Valves 162, 164 may be commanded (e.g., by controller 110) to control the amount of flow through and around the EGR cooler 166. The EGR cooler 166 may be any suitable device configured to lower the temperature of the recirculated gas. Generally, the EGR cooler 166 includes one or more recirculated gas passages and one or more coolant passages, arranged such that heat may be transferred from the recirculated gas to a cooperating fluid (e.g., air or liquid).

The turbocharger arrangement 170 generally functions to increase the amount of air subsequently directed into the engine 120 for improved engine efficiency and power output. In one example, the turbocharger arrangement 170 includes a first (or high pressure) turbine 172 that receives a portion (e.g., the first portion) of the exhaust gas, as introduced above. The turbocharger arrangement 170 further includes a first compressor 174 that is driven by the first turbine 172. The turbocharger arrangement 170 may further include a second (or low pressure) turbine 176 that receives the portion (e.g., the second portion) of the exhaust gas after the exhaust gas flows through the first turbine 172. The turbocharger arrangement 170 further includes a second compressor 178 that is driven by the second turbine 176 to compress the intake air upstream of the first compressor 174. The first and second compressors 174, 178 function to compress the ambient or charge air that enters the air intake arrangement 130 via the intake conduit 132. Generally, the first and second turbines 172, 176 may be variable-geometry turbocharger turbines, wastegate (WG) turbocharger turbines, fixed geometry turbocharger turbines, electrically controlled or assisted turbocharger turbines, and/or any other suitable type of turbocharger turbines.

As noted above, the engine 120 is selectively provided fuel for combustion by the fuel arrangement 180. Generally, the fuel arrangement 180 may include any suitable components to facilitate operation (e.g., pumping, flow control, storage, injection, and the like) of the engine 120 and overall power system 108.

In this example, the fuel arrangement 180 may include a first fuel tank 182 that stores a first fuel. In one example, the first fuel may be a relatively high cetane fuel, such as petroleum diesel (e.g., "diesel"). Other relatively high cetane fuels may include biodiesel, renewable diesel, HVO, any mixture of these fuels, and/or other liquid fuels. As shown, a pump 184 may be commanded by the controller 110 to provide the appropriate amount of fuel into the piston-cylinder sets 122 via the primary fuel injectors 126.

The fuel arrangement 180 may further include a second fuel tank 186 that stores a second fuel. In one example, the second fuel may be a relatively low cetane fuel, such as ethanol. Other relatively low cetane fuels may include denatured ethanol, hydrous ethanol, E85, gasoline, methanol, LNG, LPG, any mixture of these fuels, and/or other liquid fuels. In this example, a pump 188 and/or a second fuel injector 190*a*, 190*b* may be commanded by the controller 110 to inject an appropriate amount of the second fuel into the air flow of the EGR arrangement 160.

In the view of FIG. 2, alternative positions of the second fuel injector 190*a*, 190*b* (generically, second fuel injector 190) are depicted. In particular, the second fuel injector 190*a*, 190*b* may be positioned upstream or downstream of the EGR valve 164. In one example, the second fuel injector 190*a* is positioned in between the EGR valve 164 and the intake manifold 134. In another example, the second fuel injector 190*b* may be positioned upstream of the EGR valve 164 and the intake manifold 134. In any event, the second fuel injector 190 is typically positioned downstream of the EGR cooler 166. Generally, the second fuel injector 190 is positioned such that the second fuel is thoroughly mixed with the EGR air flow prior to being into the piston-cylinder sets 122 via the intake manifold 134. In one example, the second fuel is premixed composition with a single point injection into the hot EGR arrangement 160 to enhance vaporization and mixing, thereby promoting low cylinder variation. Additional details regarding the fuel arrangement 180, including management of the first and second fuels, are discussed below with reference to FIGS. 3-5.

Generally, any type of sensor may be provided to facilitate operation of the power system 108, including the example sensors 192*a*-192*e* schematically depicted in FIG. 2. One or more of the sensors 192*a*-192*e* may be omitted and/or additional sensors may be provided.

The sensors 192*a*-192*e* may include one or more first fuel tank sensors 192*a* to determine various characteristics of the first fuel, including quantity, quality, temperature, and/or the like. Similarly, the sensors 192*a*-192*e* may include one or more second fuel tank sensors 192*b* to determine various characteristics associated with the second fuel, including quantity, quality, temperature, and/or the like. The sensors 192*a*-192*e* may further include one or more EGR sensors 192*c* to determine various characteristics associated with the EGR arrangement 160, including flow rate, temperature, and/or pressure. The sensors 192*a*-192*e* may further include one or more intake manifold sensors 192*d* to determine various characteristics associated with the intake manifold 134, including flow rate, temperature, and/or pressure. The sensors 192*a*-192*e* may further include one or more exhaust manifold sensors 192*e* to determine various characteristics associated with the exhaust manifold 152, including temperature, and/or pressure. Generally, the sensors 192*a*-192*e* may provide inputs to the controller 110 in order to facilitate operation of the power system 108, particularly to facilitate implementation of dual fuel operation discussed below.

1 As introduced above, the controller 110 may control operation of the engine 120 and other aspects of the power system 108, as well as various other cooperating systems and components. In particular, the controller 110 may selectively command operation of the fuel arrangement 180 to provide desired ignition and combustion characteristics within the engine 120 under all appropriate conditions. Generally, the controller 110 (FIG. 1) may be in communication with the various valves 140, 162, 164; pumps 184, 188, injectors 126, 190, engine 120, sensors 192*a*-192*e*, and other associated components to collect information about operation of the power system 108 and to implement or command modification and/or maintenance of such operation.

As described in greater detail below, the controller 110 may particularly command the fuel arrangement 180 according to one or more fuel control modes, including a single fuel control mode in which only the first fuel is injected into the engine 120 and a dual fuel control mode in which a second fuel is injected into the EGR arrangement 160 for use in combination with the first fuel. As an example of one implementation of such modes, the controller 110 may operate in the singe fuel control mode at start up or at relatively low temperatures within the power system 108 in which the higher cetane first fuel is more appropriate for reliable ignition and combustion; and the controller 110 may operate in the dual fuel control mode at higher temperatures within the power system 108 in which the lower cetane second fuel may supplement the first fuel in order to provide beneficial operation, emission, and/or efficiency characteristics while maintaining reliable ignition and combustion.

The power system 108 depicted in FIG. 2 is merely one example of a power system that may utilize a mechanism to enhance efficiency and reliability with respect to ignition and/or combustion, as discussed in greater detail below with reference to FIGS. 3-5. Other configurations of power systems may be provided.

Operation of the power system 108, particularly with respect to the fuel arrangement 180, is discussed with reference to the flowchart of FIG. 3 that depicts an example method 200 of operation that may be implemented by the controller 110 and other aspects of the power system 108 of FIG. 2. In the discussion of FIG. 3 below, reference is additionally made to FIG. 2.

Figure 3:
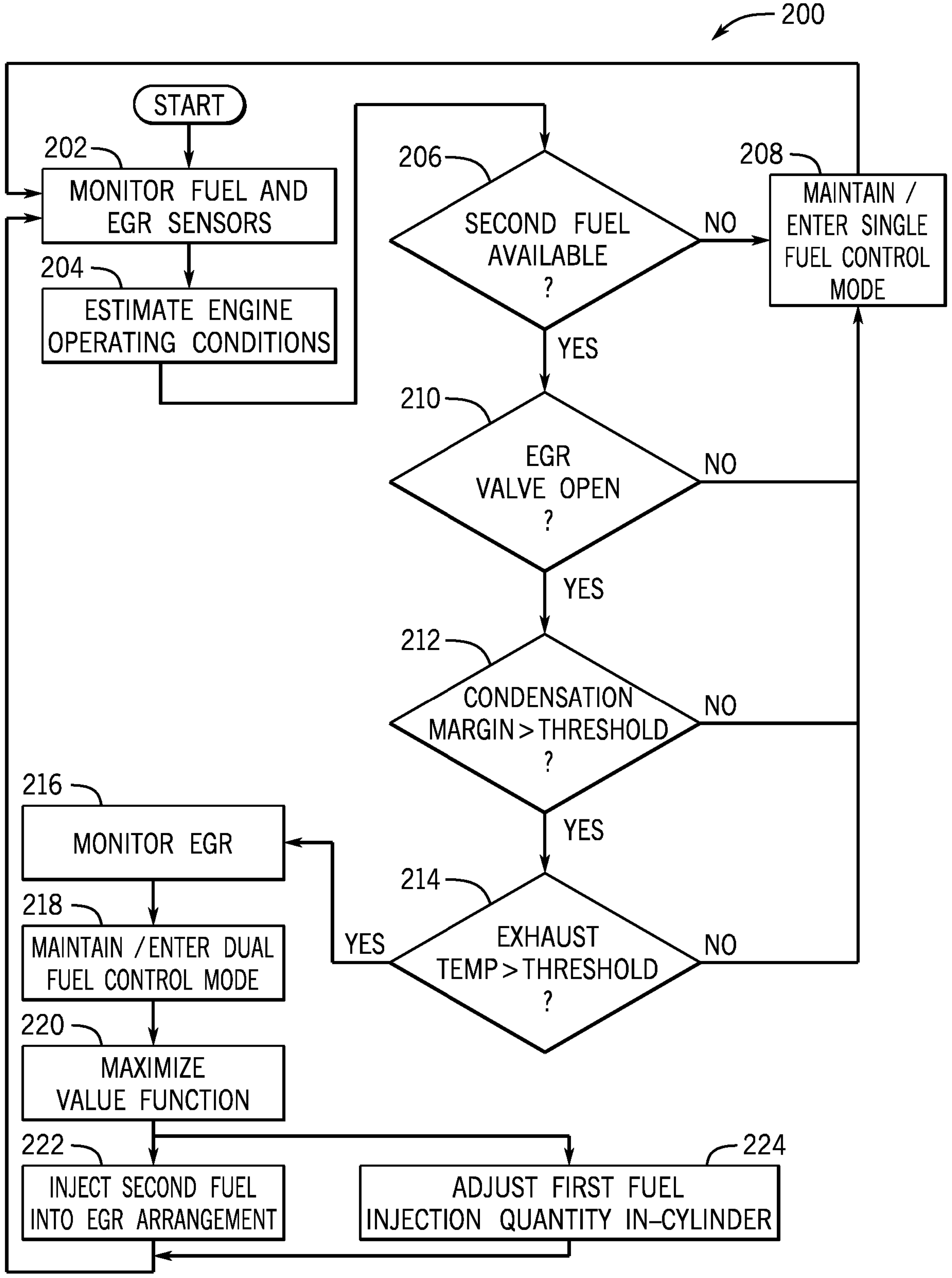
FIG. 3 is a flowchart of a method for operating a dual fuel compression ignition power system, such as that shown in FIG. 2, in accordance with an example embodiment.

Referring to the method 200 of FIG. 3, in a first step 202 of operation, the controller 110 receives and monitors sensor data (e.g., sensors 192*a*-192*c*) from the EGR arrangement 160 and the fuel arrangement 180. In a further step 204, the controller 110 measures and/or estimates the engine operation conditions (e.g., based on information from sensors 192*d*, 192*e*).

In steps 206, 210, 212, 214, the controller 110 evaluates the information associated with the engine 120, the EGR arrangement 160, and the fuel arrangement 180. In particular, in step 206, the controller 110 determines if second fuel (e.g., the low cetane fuel) is available in the second fuel tank 186. Such an evaluation may be determined by comparing the amount of fuel in the second fuel tank 186 (e.g., based on information from the second fuel tank sensor 192*b*) to a threshold. If the low cetane fuel is not available, the method 200 proceeds to step 208 in which the controller 110 maintains operation in (or modifies operation to) a single fuel control mode. In step 208, the single fuel control mode may be considered a first single fuel control mode in some examples in which the engine 120 is provided only the first fuel (e.g., the high cetane fuel) by the fuel arrangement 180. If the low cetane fuel is available, the method 200 proceeds to step 210.

In step 210, the controller 110 determines if the EGR arrangement 160 is in use, e.g., by determining if the EGR valve 164 is open. As noted, if used, the second fuel may be injected into the EGR arrangement 160. As such, if the EGR valve 164 is closed and the EGR arrangement 160 is not in operation in step 210, the method 200 proceeds to step 208 in which the controller 110 maintains operation in (or modifies operation to) the single fuel control mode. However, in step 210, if the EGR valve 164 is open, the method 200 proceeds to step 212.

In step 212, the controller 110 evaluates the condensation margin relative to a condensation margin threshold. Generally, the condensation margin threshold represents temperature and/or pressure conditions in the EGR arrangement 160 in which water or other liquid may form in the EGR arrangement 160. If the condensation margin fails to exceed the condensation margin threshold in step 212, the method 200 proceeds to step 208 in which the controller 110 maintains operation in (or modifies operation to) the single fuel control mode. However, in step 212, if the condensation margin is greater than the condensation margin threshold, the method 200 proceeds to step 214.

In step 214, the controller 110 evaluates the exhaust temperature (e.g., based on information from the exhaust manifold sensor 192*e* and/or estimated values) relative to an exhaust temperature threshold. Generally, the second fuel (like ethanol, methanol, E85, gasoline etc.) may require a particular temperature in order to vaporize and/or maintain vaporization as the fuel is injected into the EGR arrangement 160. As such, if the exhaust temperature fails to exceed the exhaust temperature threshold in step 214, the method 200 proceeds to step 208 in which the controller 110 maintains operation in (or modifies operation to) the single fuel control mode. This condition may exist, for example, during initial start-up, low loads, or at cold temperatures in which the higher cetane first fuel provides more robust ignition and combustion. However, in step 214, if the exhaust temperature is greater than the exhaust temperature threshold, the method 200 proceeds to step 216.

In step 216, the controller 110 continues to monitor the EGR arrangement 160. In some examples, the controller 110 may operate the EGR arrangement 160 based on the anticipation of operating in a dual fuel control mode. In some examples, a second fuel such as ethanol may, on a fuel energy basis, have a heat of vaporization more than six times that of a first fuel such as diesel. As a result, injection of the second fuel may reduce the EGR temperature, thereby providing improved EGR and/or enable a smaller EGR cooler 166.

In any event, the EGR arrangement 160 may selectively operate the EGR bypass valve 162 in order to provide an appropriate temperature of the exhaust gas within the EGR arrangement 160. In particular, if the temperature of the exhaust gas upon passing through the EGR cooler 166 is insufficient to maintain vaporization of the second fuel and/or if the introduction of second fuel may lower the temperature of the already cooled exhaust gas to an undesirably low temperature, the controller 110 may command the bypass valve 162 of the EGR arrangement 160 to a position that bypasses the EGR cooler 166. However, if temperature of the EGR gas within the EGR arrangement 160 is appropriate, the controller 110 may operate the EGR arrangement 160 such that the exhaust gas passes through the EGR cooler 166.

Figure 4:
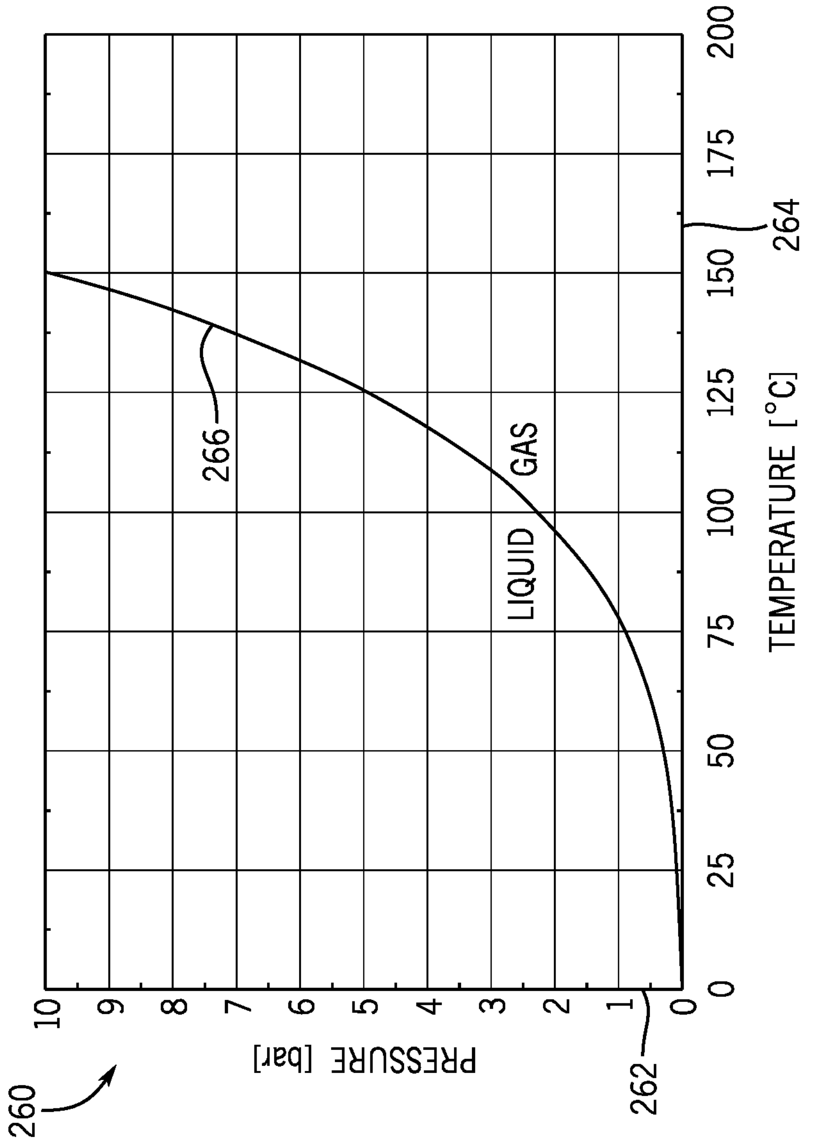
FIG. 4 is a chart depicting fuel phases as a function of temperature and pressure that may be considered in the implementation of the system of FIG. 2 and the method of FIG. 3 in accordance with an example embodiment.

As a brief example, reference is made to FIG. 4, which is a chart 260 depicting a phase line 266 of ethanol as an example second fuel as a function of both pressure on the vertical axis 262 and temperature on the horizontal axis 264. In particular, pressure and temperature combinations above the line 266 represent liquid phases for ethanol and pressure and temperature combinations below the line 266 represent gas phases for ethanol. The controller 110 may consider the conditions within the EGR arrangement 160 such that any second fuel injected into the EGR arrangement 160 is a vapor prior to entering the engine 120.

Returning to FIG. 3, in step 218, the controller 110 may initiate the dual fuel control mode. As part of this initiation, in some examples, the method 200 proceeds to step 220 in which a value function may be considered by the controller 110. In particular, the controller 110 may consider one or more various parameters that may influence the amount of second fuel that may be injected into the EGR arrangement 160. For example, the customer (or operator) may have preferences about the nature of the performance and/or operation. In some situations, there may be a preference for higher cetane fuel (e.g., the second fuel) or for lower cetane fuel (e.g., the first fuel). In other examples, the fuel prices or tax issues may warrant favoring one type of fuel over the other. In further examples, legal or environmental issues may favor one type of fuel over the other. Such consideration may further include vehicle productivity and/or total fuel range. Generally, the physical and/or thermodynamic conditions within the power system 108 may require a minimum (or maximum) type of fuel, but otherwise, the power system 108 may be able to operate with relative ranges of the dual fuel types. In some examples, the value function of step 220 may influence the selection of fuels within these ranges. In other examples, step 220 may be omitted, and the relative amounts of fuels may be predetermined and/or may be based entirely on operating conditions.

In step 222, the controller 110 commands injection of the second fuel within the EGR arrangement 160. As noted above, the second fuel injector 190 may inject the second fuel from the second fuel tank 186 in a position downstream of the EGR cooler 166, either upstream or downstream of the EGR valve 164. During the dual fuel control mode, the controller 110 may command injection of the second fuel into the EGR arrangement 160 in any manner, including variable flow, continuous flow, and/or pulsed flow.

Figure 5:
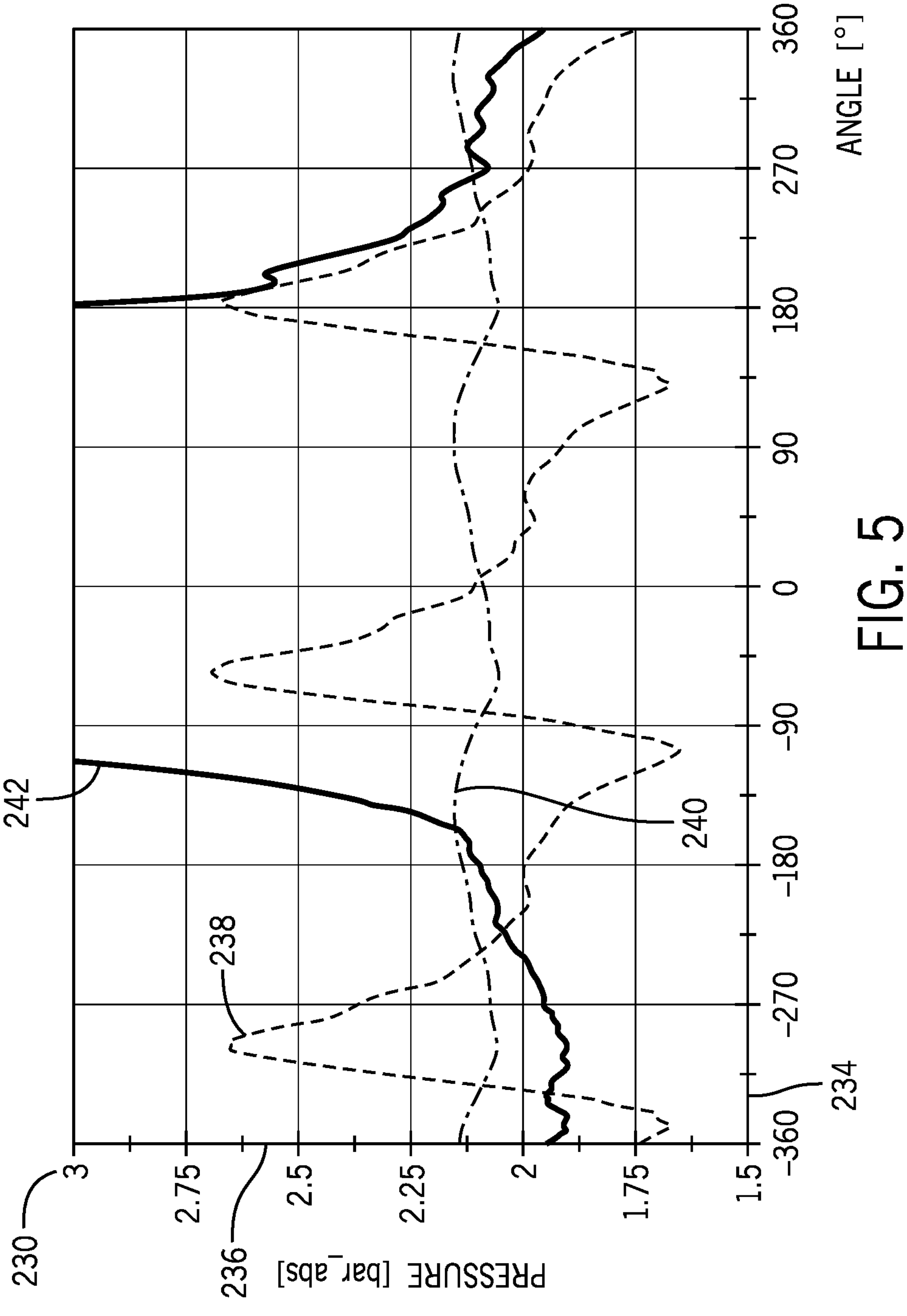
FIG. 5 is a chart depicting pressures during an engine power cycle that may be considered in the implementation of the system of FIG. 2 and the method of FIG. 3 in accordance with an example embodiment.

Reference is briefly made to FIG. 5, which is a chart 230 depicting pressures, represented on the vertical axis 236, as a function of power cycle position, represented on the horizontal axis 234. Each line 238, 240, 242 reflects the respective pressure during the power cycle (e.g., between −360° and 360°). Line 238 of the chart 230 depicts the pressure within exhaust manifold 152; line 240 of the chart 230 depicts the pressure within the intake manifold 134; and line 242 of the chart 230 depicts the pressure within one of the piston-cylinder sets 122. If the second fuel is injected with a pulsed flow, the controller 110 may command the second fuel injector 190 for approximate synchronization with the power cycle, particularly such that the second fuel is injected when the flow rate within the EGR arrangement 160 is highest, and such flow rate typically occurs when the pressure within the exhaust manifold is greatest. As such, in the example of FIG. 5, the second fuel injector 190 may inject the second fuel at the peaks of line 238 (e.g., at approximately −300°, −60°, and 180°), representing the peaks of the exhaust manifold pressures in order to provide more effective mixing.

Returning to FIG. 3, upon initiating step 222, the method 200 may additionally proceed to step 224 in which the controller 110 commands that the equivalent quantity of first fuel injected by the first fuel injector is reduced by the amount of second fuel being injected into the EGR arrangement 160. As a result, the power generated with the dual fuels is equivalent to the power that would otherwise be generated with the single fuel. The relative amounts of first and second fuels may vary, including effectively entirely second fuel and very little first fuel to effectively all first fuel and very little second fuel. In some situations, the controller 110 may command, in effect, a second fuel control mode in which the second fuel entirely replaces the first fuel. Generally, as discussed above, the controller 110 may command a predetermined and/or variable ratio of second fuel to first fuel during the dual fuel control mode. For example, the second fuel may make up between 0% to 90% of the overall fuel provided to the engine 120.

Upon performing steps 222, 224, the method 200 may end, or the method 200 may return to step 202 in which the conditions are reevaluated in order to maintain or enter the single and/or dual fuel control modes.

Accordingly, the power systems discussed above provide the ability to use ethanol and other low cetane fuels in a diesel-type compression ignition engine over a range of conditions, including cold starts and low load conditions. Overall, the power systems described herein result in a platform architecture that may provide improved fuel consumption, higher performance, and reduced criteria pollutants over a relatively wide temperature operating window.

Such power systems may provide the desired ignition and combustion characteristics while enabling the use of the lower cetane fuels that may have more desirable costs and/or emissions. Overall, such power systems may provide lower emissions (e.g., $CO_2$, $NO_X$, BSFC), improvements in misfire and knock margin, lower temperature operation, and stable combustion. The power systems may be implemented by retrofitting existing systems without undue additional hardware and/or redesign, or such implementations may be provided in initial design.

As will be appreciated by one skilled in the art, certain aspects of the disclosed subject matter may be embodied as a method, system (e.g., a work vehicle control or power system included in a work vehicle), or computer program product. Accordingly, certain embodiments may be implemented entirely as hardware, entirely as software (including firmware, resident software, micro-code, etc.) or as a combination of software and hardware (and other) aspects. Furthermore, certain embodiments may take the form of a computer program product on a computer-usable storage medium having computer-usable program code embodied in the medium.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be non-transitory and may be any computer readable medium that is not a computer readable storage medium and that may communicate, propagate, or transport a program for use by or in connection with an instruction execution system, apparatus, or device.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the work vehicles and the control systems and methods described herein are merely exemplary embodiments of the present disclosure.

For the sake of brevity, conventional techniques related to work vehicle and engine operation, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The description of the present disclosure has been presented for purposes of illustration and description, but it is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A power system for a work vehicle, comprising:

an intake manifold configured to intake charge air;

a first fuel tank configured to store a first fuel and a second fuel tank configured to store a second fuel;

a compression ignition engine including a fuel injector and a plurality of piston-cylinder sets configured to receive, ignite, and combust the first fuel, the second fuel, or a combination of the first and second fuels with the charge air from the intake manifold to generate mechanical power and exhaust gas;

an exhaust gas recirculation (EGR) circuit configured to direct a portion of the exhaust gas back into the compression ignition engine and having an EGR injector configured to selectively inject the second fuel from the second fuel tank into the EGR circuit; and a controller having electronic processing and memory architecture wherein, in a dual fuel control mode, the controller commands the fuel injector such that the first fuel is directed into the compression ignition engine and commands the EGR injector such that the second fuel, and not the first fuel, is additionally directed into the compression ignition engine via the EGR circuit.

2. The power system of claim 1, wherein the first fuel has a higher cetane value than the second fuel.

3. The power system of claim 2, wherein the intake manifold includes an intake manifold arranged to direct the charge air into the compression ignition engine, and wherein the EGR injector is positioned to selectively direct the second fuel into the EGR circuit upstream of the intake manifold.

4. The power system of claim 2, wherein the EGR circuit includes an EGR cooler configured to cool the exhaust gas prior to redirection back into the compression ignition engine, and wherein the EGR injector is positioned to inject the second fuel into the EGR circuit downstream of the EGR cooler.

5. The power system of claim 4, wherein the EGR circuit includes a bypass valve upstream of the EGR cooler such that, in a first position of the bypass valve, the exhaust gas passes through the EGR cooler and, in a second position of the bypass valve, the exhaust gas bypasses the EGR cooler.

6. The power system of claim 2, wherein the EGR circuit includes an EGR control valve, and the EGR injector is positioned to inject the second fuel into the EGR circuit upstream of the EGR control valve.

7. The power system of claim 2, wherein the EGR circuit includes an EGR control valve, and the EGR injector is positioned to inject the second fuel into the EGR circuit downstream of the EGR control valve.

8. The power system of claim 2, wherein the control system is configured to selectively inject the second fuel into the EGR circuit based on exhaust gas temperature.

9. The power system of claim 2, wherein the first fuel is diesel and the second fuel is ethanol.

10. The power system of claim 1, wherein in a single fuel control mode, the controller commands the fuel arrangement such that only the first fuel is directed into the compression ignition engine.

11. A work vehicle, comprising:

a chassis;

a drive assembly supported on the chassis; and a power system supported on the chassis and configured to power the drive assembly, the power system comprising:

an intake manifold configured to intake charge air;

a first fuel tank configured to store a first fuel and a second fuel tank configured to store a second fuel;

a compression ignition engine including a fuel injector and a plurality of piston-cylinder sets configured to receive, ignite, and combust the first fuel, the second fuel, or a combination of the first and second fuels with the charge air from the intake manifold to generate mechanical power and exhaust gas;

an exhaust gas recirculation (EGR) circuit configured to direct a portion of the exhaust gas back into the compression ignition engine and having an EGR injector configured to selectively inject the second fuel from the second fuel tank into the EGR circuit; and a controller having electronic processing and memory architecture wherein, in a dual fuel control mode, the controller commands the fuel injector such that the first fuel is directed into the compression ignition engine and commands the EGR injector such that the second fuel, and not the first fuel, is additionally directed into the compression ignition engine via the EGR circuit.

12. The work vehicle of claim 11, wherein the first fuel has a higher cetane value than the second fuel.

13. The work vehicle of claim 12, wherein the intake manifold includes an intake manifold arranged to direct the charge air into the compression ignition engine, and wherein the EGR injector is positioned to selectively direct the second fuel into the EGR circuit upstream of the intake manifold.

14. The work vehicle of claim 12, wherein the EGR circuit includes an EGR cooler configured to cool the exhaust gas prior to redirection back into the compression ignition engine, and wherein the EGR injector is positioned to inject the second fuel into the EGR circuit downstream of the EGR cooler.

15. The work vehicle of claim 14, wherein the EGR circuit includes a bypass valve upstream of the EGR cooler such that, in a first position of the bypass valve, the exhaust gas passes through the EGR cooler and, in a second position of the bypass valve, the exhaust gas bypasses the EGR cooler.

16. The work vehicle of claim 12, wherein the EGR circuit includes an EGR control valve, and the EGR injector is positioned to inject the second fuel into the EGR circuit upstream of the EGR control valve.

17. The work vehicle of claim 12, wherein the EGR circuit includes an EGR control valve, and the EGR injector is positioned to inject the second fuel into the EGR circuit downstream of the EGR control valve.

18. The work vehicle of claim 12, wherein the control system is configured to selectively inject the second fuel into the EGR circuit based on exhaust gas temperature.

19. The work vehicle of claim 12, wherein the first fuel is diesel and the second fuel is ethanol.

20. The work vehicle of claim 11, wherein in a single fuel control mode, the controller commands the fuel arrangement such that only the first fuel is directed into the compression ignition engine.

* * * * *